Figure 1:
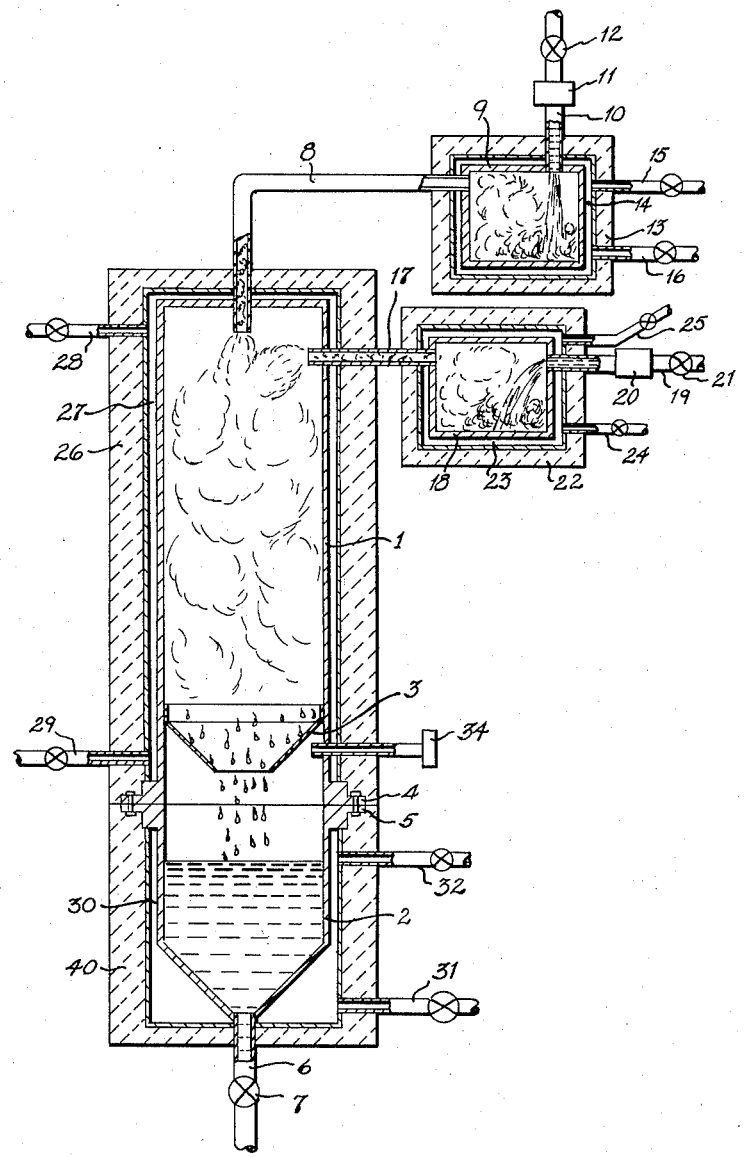

Oct. 14, 1958     C. E. RICK     2,856,335
PROCESS FOR THE PRODUCTION OF SALT COMPOSITIONS
Filed Dec. 1, 1954

INVENTOR
CHRISTIAN E. RICK

BY

ATTORNEY

United States Patent Office 2,856,335
Patented Oct. 14, 1958

2,856,335

PROCESS FOR THE PRODUCTION OF SALT COMPOSITIONS

Christian E. Rick, Wilmington, Del., assignor to E. I. du Pont de Nemours and Company, Wilmington, Del., a corporation of Delaware Application December 1, 1954, Serial No. 472,493

5 Claims. (Cl. 204—64)

This invention relates to an improved process for the production of mixed salt compositions comprising an alkali metal halide and subhalides of certain metals of group IV of the periodic arrangement of elements. It relates particularly to a new and improved process for the production of titanium subchloride-sodium chloride salt compositions.

Titanium subhalides are well known to be useful as bleaching agents for textile goods and as stripping agents in the leather industry. Zirconium and hafnium subhalides are similarly useful. These metal subhalides are also useful for the preparation of their respective metals through reduction of electrolysis or chemical reaction with reducing agents, for example, hydrogen or metallic sodium. They may also serve as reagents to obtain novel and useful metallic coatings on silica-containing solid materials.

It has been known heretofore to produce titanium metal by reacting titanium tetrachloride with molten alkali metal, particularly molten sodium. In one known method the alkali metal is retained in the reaction zone in the liquid phase as a pool and titanium tetrachloride vapor is contacted therewith. In such a process the presence of excess reducing metal causes the reduction to continue to completion to form titanium metal. If such reduction is conducted with carefully controlled and proportioned amounts of molten alkali metal and titanium tetrachloride, a titanium subchloride salt composition, comprising a mixture of titanium dichloride, titanium trichloride, titanium tetrachloride, and alkali-metal chloride, will be formed but a number of difficulties will be encountered.

By reason of the unavoidable presence of alkali metal oxides and dissolved metals in the liquid molten alkali metal the resulting titanium subchloride salt can not be used in a reduction step to produce pure titanium metal since these impurities tend to segregate in the titanium metal. Such impure titanium metal is unsuitable for many uses.

Also, where controlled and proportioned quantities of molten alkali metal and titanium tetrachloride are passed into a reactor a severe and highly objectionable buildup of massive growths of titanium sponge saturated with salt and unreacted alkali metal around the alkali metal inlet or nozzle is encountered. Such buildup will eventually cause plugging of the nozzle or the entire reactor, thus preventing further operation. This type of plugging is apparently self-accelerating and when started builds up very rapidly and soon causes complete shutdown of the equipment.

It is an object of this invention to provide a new and improved method for reacting alkali metal and tetrahalides of certain metals of group IV of the periodic arrangement of elements.

It is another object of this invention to provide a process for the production of a superior metal subhalide-alkali metal halide salt mixture.

It is a specific object of this invention to provide a continuous process for reducing metal tetrahalides by an improved technique to obtain metal subhalide-alkali metal halide salt mixture.

Other objects of the invention will appear hereinafter.

The objects and purposes of this invention may be achieved by passing into contact with each other the vapor of an alkali metal taken from the group consisting of sodium and potassium with the vapor of a metal tetrahalide taken from the group consisting of the tetrafluorides, tetrachlorides, tetrabromides, and tetraiodides of titanium, zirconium, and hafnium at a temperature above the condensation temperature of the vapors and at a pressure at least atmospheric, said passage of vapors being regulated to maintain an atomic ratio of alkali metal to metal in the tetrahalide of less than 2:1, and collecting the product halide salts at a temperature above the vaporization temperature of said tetrahalide.

In order that the invention may be more readily understood the following detailed description will make specific reference to the reduction of titanium tetrachloride with metallic sodium and will refer particularly to the accompanying illustration.

The accompanying illustration, Fig. 1, is a drawing representing a cross-sectional view through one embodiment of apparatus suitable for use in practicing the process of this invention.

Referring to the drawing, reference numeral 1 designates a reaction chamber into which vapors of elemental sodium and titanium tetrachloride are passed for reaction with each other. The reduction products of the reaction, sodium chloride and subchlorides of titanium, condense and are collected in collection chamber 2 as a liquid which may be withdrawn through drain conduit 6, controlled by valve 7. The lower end of the reaction chamber may be provided with a baffle 3 to prevent heat losses from the reaction chamber to collection chamber 2. The reaction and collection chambers may be fastened together by flanges 4 and 5 so that they may be disconnected for cleaning purposes. If desired, the two chambers may be spaced from each other with conduit means passing the products of reaction from the reaction chamber to the collection chamber.

The sodium vapor is passed into chamber 1 through pipe line 8 from flash vaporization vessel 9. Liquid molten sodium is metered into vessel 9 through line 10, flow meter 11, and valve 12. Vaporization vessel 9 is maintained at a temperature at which the molten sodium is instantly vaporized and passed in the vapor form to the reactor 1. Vessel 9 is spaced from and surrounded by a refractory insulating member 13, and the necessary heat to vessel 9 is supplied by means of hot combustion gases passed through space 14 by means of pipes 15 and 16. If desired, the heat may be supplied by electrical resistance means positioned within space 14, or in any other desired manner.

The titanium tetrachloride vapor is passed into chamber 1 through pipe line 17 from vaporization vessel 18. Liquid titanium tetrachloride is metered into vaporization vessel 18 through line 19, flow meter 20, and valve 21. The tetrachloride is instantly vaporized by maintaining vessel 18 at the required temperature by heating the same, for example, by passing hot combustion gases through lines 24 and 25 and space 23 between vessel 18 and refractory insulating means 22. The pressure within the reaction and collection chambers can be read on pressure gage 34 projecting through the side of the reaction chamber.

Reaction chamber 1 should be maintained at a temperature above the condensation temperature of the vapors of sodium metal and titanium tetrachloride, and collection chamber 2 should be maintained above the condensation temperature of titanium tetrachloride but below the condensation temperature of the products of the reaction. This may again be accomplished by passing the necessary heating or cooling gases or liquids through the spaces 27 or 30 between the respective reaction and collection chambers 1 and 2 and the refractory insulation covers 26 and 40. The heating or cooling gases or liquids may be passed through space 27 by means of lines 28 and 29 and through space 30 by means of lines 31 and 32. Any other means of heating, or cooling, chambers 1 and 2 may, of course, be employed. The temperatures in the several chambers and vessels may be determined by means of conventional thermocouples and indicating instruments, and necessary adjustments may be made by valves controlling the inlet or outlet of heating or cooling gases or by electrical resistance elements where electrical heating elements are employed.

The two reactants, titanium tetrachloride and elemental sodium, are introduced into the reaction chamber simultaneously as vapors at predetermined metered rates with the rate of sodium vapor flow being less than that required to maintain an atomic ratio of sodium metal to the titanium metal content of the titanium tetrachloride of 2:1. Under these conditions the titanium subchlorides produced will have an average chlorine content of between 2 and 4 chlorine atoms per atom of titanium, and the chlorine removed from the tetrachloride will be present as sodium chloride. The atmosphere within the reaction chamber closely adjacent to the inlet ports of sodium and titanium tetrachloride will contain a mixture of the reactants and as the reactants traverse the reactor the atmosphere becomes depleted in sodium as it reacts until the atmosphere consists almost entirely of titanium tertachloride vapor which is present over the salt composition which has condensed until it is removed from the collection chamber.

The temperature in the salt composition collection chamber is an important variable affecting the chlorine to titanium ratio of the salt composition. The temperature in the collection system should be above the boiling point of the titanium tetrachloride, at about atmospheric pressure above the normal boiling point (about 137° C.) of $TiCl_4$, in order that substantially atmospheric pressure or above may exist in the collection system and in the reactor with which it is connected. The tetrahalides of the metal show varying amounts of solubility in the salt composition depending upon the nature of the salt composition and upon the temperature at which the absorption occurs. As the collection temperature is increased the halogen to metal ratio in the salt composition is reduced. In other words there is a decreased solubility of the tetrahalide in the salt composition as temperature is increased. The salt composition may be collected as a molten salt mass or it may be chilled and a solid material recovered. The temperature of collection wherein the salt composition is in contact with an atmosphere of the tetrahalide allows one to obtain molten salt compositions of varying halogen to metal subhalide compositions. For instance, in a run where the salt composition was collected and held at a temperature of 365° C. the chlorine to titanium ratio of the titanium subchloride was 2.85:1 and in a second experiment where the salt composition was collected and held at 850° C. in the presence of titanium tetrachloride the chlorine to titanium ratio was 2.62:1. For a given approximate rate of production of the salt composition the sodium rate may be set and the titanium tetrachloride rate adjusted to give the approximate pressure desired with the collection system being held at the temperature required for the desired chlorine to titanium ratio. An increase in the pressure within the reaction and collection system will result in an increase in the chlorine to titanium ratio because of the influence of pressure to increase the solubility of the titanium tetrachloride in the molten salt composition.

The total pressure in the reactor and collection system may be atmospheric or superatmospheric up to about 2 atmospheres to provide that leaks in the equipment will allow materials to escape from the system and not allow atmospheric vapors to enter into the reaction or collection spaces. Pressure higher than 2 atmospheres can be used but constitutes no real advantage. This is a decided advantage in the method of this invention over operation at subatmospheric pressures because of the greatly lessened danger of contamination due to small leaks or inadvertent accident in the operation of the unit.

To a clearer understanding of the invention, the following examples are given to serve merely as illustrations of the invention and not to be construed as limiting its principle and scope.

*Example I*

Titanium tetrachloride and sodium metal were reacted in an apparatus similar to that shown in the figure. The reactor consisted of a cylinder approximately eight inches in diameter by thirty-six inches in length made of stainless steel. The reactor and condensing sections were purged of atmospheric contaminants by use of argon and this inert gas was flushed from the system by a flow of titanium tetrachloride vapor. Titanium tetrachloride was metered as a liquid and introduced at a constant measured rate into its flash boiler. The titanium tetrachloride vapor passed into the reactor at a temperature of about 400° C. Liquid sodium metal at a temperature slightly above its melting point was introduced continuously at a measured rate into the flash boiler which was maintained at a temperature above the atmospheric boiling point of sodium or about 900–975° C. The sodium vapor generated in the boiler passed through the feed tube into the reactor. The pressure within the reactor was maintained slightly above atmospheric pressure, that is about equivalent to 5 inches water positive pressure, by regulating the amount of titanium tetrachloride and sodium added to the system. The reactor temperature was maintained in the range of about 800–900° C. by regulating the furnacing means surrounding the reactor. The molten titanium subchloride-sodium chloride salt composition drained continuously from the reaction section of the unit and collected in the lower section of the apparatus. The collection portion of the system was held at about 800° C. with the temperature being measured by a thermocouple positioned in a thermocouple well in the walls of the collection section. Sodium metal and titanium tetrachloride were fed in a weight ratio of approximately 1 to 5.9 equivalent to an atomic ratio of sodium to titanium of about 1.4 to 1, and the salt composition was approximately $TiCl_{2.6} \cdot 1.4NaCl$. Production rates up to over 100 lbs. per hour of salt were achieved in this unit.

*Example II*

The apparatus utilized in Example I was also used in this experiment except that the collection system temperature was lowered by blowing air through chamber (30) with the amount of air controlled so that the temperature within the condensing system could be controlled. The apparatus was purged as in Example I and the purging gas replaced with titanium tetrachloride vapor. After heating the apparatus and stabilizing the temperature conditions to about 800–900° C. in the reaction system and about 300–400° C. in the condensing section the flow of titanium tetrachloride and sodium was initiated. The sodium and titanium tetrachloride were fed in the weight ratio of approximately 1 to 6.8, or an atomic ratio of sodium to titanium of about 1.2 to 1 to form a titanium subchloride sodium chloride salt of the composition of approximately $TiCl_{2.8} \cdot 1.2NaCl$. This salt composition was produced at rates in excess of 100 lbs. per hour. An excellent material balance could be calculated for this experiment also showing that no solid material, such as metallic titanium, was being deposited in the apparatus. The titanium tetrachloride and sodium entering as reactants appeared in the product salt composition. After this run was completed and the apparatus cooled it was dissembled for observation. It was obvious that no difficulty was encountered because of plugging of the nozzles as there were no appreciable deposits of metal near either inlet. Also on opening up the sodium vaporizer the presence of a solid deposit of impurities was observed. This material was left behind in the boiler from the sodium feed, showing that the sodium vapor entering the reaction was purer than the liquid sodium fed to the vaporizer. Obviously, the prevention of this amount of impurities from entering the reaction results in better quality of subchloride salt which if reduced to titanium metal would produce a purer metal than if liquid sodium feed had been utilized.

The essentials of my process comprise the reacting of the metal tetrahalide vapor with the vaporous alkali reducing metal in a reactor free of deleterious impurities. Although much of the specific description and the examples refer specifically to the reaction of titanium tetrachloride with sodium, the tetrahalide to be reacted may be selected from the group consisting of the tetrafluorides, tetrachlorides, tetrabromides, and tetraiodides of the metals titanium, zirconium, and hafnium. The alkali metal reducing agent may be selected from the group consisting of sodium and potassium. During the reaction, the metal tetrahalide and reducing alkali metal are fed into the reaction zone in the vaporous state, and the reaction zone is maintained above the condensation temperature of the reactants. The upper temperature of the reaction is limited to that below which corrosion of the vessel walls and contamination of the product salt occurs. The reactants are separately metered so that the ratio between the reactants may be controlled and so that the pressure within the reaction and condensing system of the metal tetrahalide vapor may be controlled.

The reaction zone temperature may be controlled by the amount of reactants utilized in a given size reactor or by changing the heating or cooling means in the furnace structure surrounding the reaction zone section. The heating means surrounding the reactor is preferably provided with controlled heating means which may be regulated to control the temperature, or cooling means such as air may be circulated through the furnace structure and around and over the outer reactor surface to aid in removing excess heat and controlling the temperature.

The temperature of the reactor walls may be held below the melting point of the salt composition to provide a lining or skull of solid salt which protects the reactor walls from corrosive conditions. For high production rates the walls of the reactor may be jacketed or wound with coils of tubes through which a heat transfer fluid may be passed to increase the amount of heat withdrawn.

The pressure within the reaction and collection system is controlled by the ratio of titanium tetrachloride to sodium and the amount of titanium tetrachloride fed.

The rates of addition to reactants are controlled to maintain an atomic ratio of alkali metal to the metal in the tetrahalide of less than 2:1. When the ratio is allowed to increase over 2:1, that is in the range of 2.5:1 to 3:1, some titanium metal is produced which tends to clog up the apparatus and adversely affect its course.

The inert gas to purge the system of air at the initiation of the reaction may be argon, neon, helium, or other rare gas that is non-reactive with the alkali metal or tetrahalide vapors employed.

I claim as my invention:

1. The process which comprises simultaneously passing into a substantially vapor-filled reaction chamber for reaction with each other while moving through said chamber a vaporous stream of an alkali metal from the group consisting of sodium and potassium and a vaporous stream of a group IV metal tetrahalide from the group consisting of tetrafluorides, tetrachlorides, tetrabromides, and tetraiodides of titanium, zirconium, and hafnium at a temperature above the condensation temperature of said vapors and at a pressure of at least atmospheric, said passage of vapors being regulated to maintain an atomic ratio of alkali metal to metal in the tetrahalide of less than 2:1, condensing and recovering the resulting group IV metal subhalide-alkali metal halide salt composition at a temperature above the vaporization temperature of said metal tetrahalide.

2. The process which comprises continuously and simultaneously passing into a substantially vapor-filled reaction chamber for reaction with each other while moving through said zone a vaporous stream of an alkali metal from the group consisting of sodium and potassium and a vaporous stream of a group IV metal tetrahalide from the group consisting of the tetrafluorides, tetrachlorides, tetrabromides, and tetraiodides of titanium, zirconium, and hafnium at a temperature maintained above the condensation temperature of said vapors and at a pressure of at least atmospheric, said passage of vapors being regulated to maintain an atomic ratio of alkali metal to metal in the tetrahalide of less than 2:1, continuously condensing and recovering the resulting group IV metal subhalide-alkali metal halide salt composition at a temperature above the vaporization temperature of said metal tetrahalide.

3. The process which comprises simultaneously passing into a substantially vapor-filled reaction chamber for reaction with each other while moving through said chamber a vaporous stream of elemental sodium and a vaporous stream of titanium tetrachloride at a temperature above the condensation temperature of said vapors and at a pressure of at least atmospheric, said passage of vapors being regulated to maintain an atomic ratio of sodium to titanium of less than 2:1, condensing and recovering the resulting titanium subchloride-sodium chlorides salt composition at a temperature above the vaporization temperature of the titanium tetrachloride.

4. The process which comprises continuously and simultaneously passing into a substantially vapor-filled reaction chamber for reaction with each other while moving through said zone a vaporous stream of elemental sodium and a vaporous stream of titanium tetrachloride at a temperature maintained above the condensation temperature of said vapors and at a pressure of at least atmospheric, said passage of vapors being regulated to maintain an atomic ratio of sodium to titanium of less than 2:1, continuously condensing and recovering the resulting titanium subchloride-sodium chloride salt composition at a temperature above the vaporization temperature of titanium tetrachloride.

5. The process which comprises continuously and simultaneously passing into a substantially vapor-filled reaction chamber for reaction with each other while moving through said zone a vaporous stream of elemental sodium and a vaporous stream of titanium tetrachloride at a temperature between 800° C. and 900° C. and at a pressure between one and two atmospheres, said passage of vapors being regulated to maintain an atomic ratio of sodium to titanium of less than 2:1, continuously condensing and recovering the resulting titanium subchloride-sodium chloride salt composition at a temperature between 300° C. and 850° C.

References Cited in the file of this patent

UNITED STATES PATENTS

| | | |
|---|---|---|
| 2,618,550 | Hampel et al. | Nov. 18, 1952 |
| 2,647,826 | Jordan | Aug. 4, 1953 |
| 2,765,270 | Brenner et al. | Oct. 2, 1956 |

OTHER REFERENCES

Trans. Faraday Soc., vol. 32 (1936), pp. 633–642.
Gmelin's "Handbuch der Anorganischen Chemie," 8 Aufl., vol. 41, page 295.
Gmelin: vol. 41, page 295.

UNITED STATES PATENT OFFICE
CERTIFICATE OF CORRECTION

Patent No. 2,856,335

October 14, 1958

Christian E. Rick

It is hereby certified that error appears in the printed specification of the above numbered patent requiring correction and that the said Letters Patent should read as corrected below.

Column 5, line 57, for "to", first occurrence, read -- of --; column 6, line 13, for "zone" read -- chamber --; lines 36 and 37, for "chlorides" read -- chloride --; lines 42 and 55, for "zone", in each occurrence, read -- chamber --.

Signed and sealed this 10th day of February 1959.

(SEAL)

Attest:

KARL H. AXLINE
Attesting Officer

ROBERT C. WATSON
Commissioner of Patents